US010179443B2

(12) United States Patent
Mendez et al.

(10) Patent No.: US 10,179,443 B2
(45) Date of Patent: Jan. 15, 2019

(54) WINDOW TINTING TOOL

(71) Applicant: Tri-Edge Industries, LLC, Lake Worth, FL (US)

(72) Inventors: Jay Mendez, Greenacres, FL (US); Glenn Schneider, Lake Worth, FL (US)

(73) Assignee: TRI-EDGE INDUSTRIES, LLC, Lake Worth, FL (US)

( * ) Notice: Subject to any disclaimer, the term of this patent is extended or adjusted under 35 U.S.C. 154(b) by 0 days.

(21) Appl. No.: 15/478,536

(22) Filed: Apr. 4, 2017

(65) Prior Publication Data
US 2018/0281372 A1 Oct. 4, 2018

(51) Int. Cl.
*B32B 37/10* (2006.01)
*B32B 37/00* (2006.01)
*B60J 1/18* (2006.01)
*B32B 17/10* (2006.01)

(52) U.S. Cl.
CPC ........ *B32B 37/003* (2013.01); *B32B 37/0046* (2013.01); *B32B 17/10816* (2013.01); *B32B 2605/006* (2013.01); *B60J 1/18* (2013.01)

(58) Field of Classification Search
CPC ............ B32B 37/003; B32B 2605/006; B32B 17/10816
See application file for complete search history.

(56) References Cited

U.S. PATENT DOCUMENTS

| D191,499 | S | * | 10/1961 | Donay | D32/41 |
| D261,601 | S | * | 11/1981 | Kettlestrings | D32/40 |
| D332,160 | S | * | 12/1992 | Kuzma | D32/41 |
| D363,004 | S | * | 10/1995 | Popek | D7/644 |
| 5,491,869 | A | * | 2/1996 | Sullivan | A47J 43/288 |
| | | | | | 15/143.1 |
| D469,322 | S | * | 1/2003 | Jørgensen | D7/653 |

(Continued)

FOREIGN PATENT DOCUMENTS

| DE | 102010045992 A1 | * | 3/2012 | E04F 21/1652 |
| JP | 06335431 A | * | 12/1994 | |

OTHER PUBLICATIONS

Amazon.com.uk page for Chef'n. Switchit Double Ended Spoon Spatula Arugula Colour, Apr. 2018, https://www.amazon.co.uk/Chefn-Switchit-Double-Spatula-Arugula/dp/B002CGS53Y.*

*Primary Examiner* — Mark A Osele
(74) *Attorney, Agent, or Firm* — Robert M. Downey, P.A.

(57) ABSTRACT

A tool for applying tint film to the rear window of an automobile has a unitary body with a concave top side and a convex bottom side, and the unitary body including a first elongate wing with front and rear edges extending to a first distal end, and an opposite second elongate wing with front and rear edges extending to a second distal end, and a central portion between the first and second elongate wings. The unitary body includes a skeletal frame member and flexible blades fitted to the skeletal frame member and extending about a periphery of the first and second elongate wings to define the front and rear edges and distal ends. The skeletal frame maintains desired curvature and prevents excessive flexing and bending of the elongate wings. The first and second wings have different degrees of curvature measured transversely between the respective front and rear edges.

6 Claims, 4 Drawing Sheets

(56) References Cited

U.S. PATENT DOCUMENTS

| | | | | |
|---|---|---|---|---|
| 6,733,442 | B1 * | 5/2004 | Larnard | A61B 17/02 600/203 |
| D502,580 | S * | 3/2005 | Williams | D32/41 |
| 7,225,848 | B2 * | 6/2007 | Williams | B29C 63/0047 156/574 |
| D620,768 | S * | 8/2010 | Jossem | D7/688 |
| D631,711 | S * | 2/2011 | Jossem | D7/688 |
| 8,012,280 | B1 * | 9/2011 | Thorpe | B65H 37/005 156/267 |
| D719,422 | S * | 12/2014 | Mendez | D8/14 |
| 9,027,194 | B2 * | 5/2015 | Silva | A47J 43/288 15/236.09 |
| 9,241,599 | B2 * | 1/2016 | Cooper | A47J 43/288 |
| 9,289,942 | B2 * | 3/2016 | Jensen | B29C 63/0004 |
| 2008/0156423 | A1 * | 7/2008 | Reuter | B44C 1/105 156/230 |
| 2011/0191974 | A1 * | 8/2011 | Holcomb | A47J 43/281 15/236.01 |

* cited by examiner

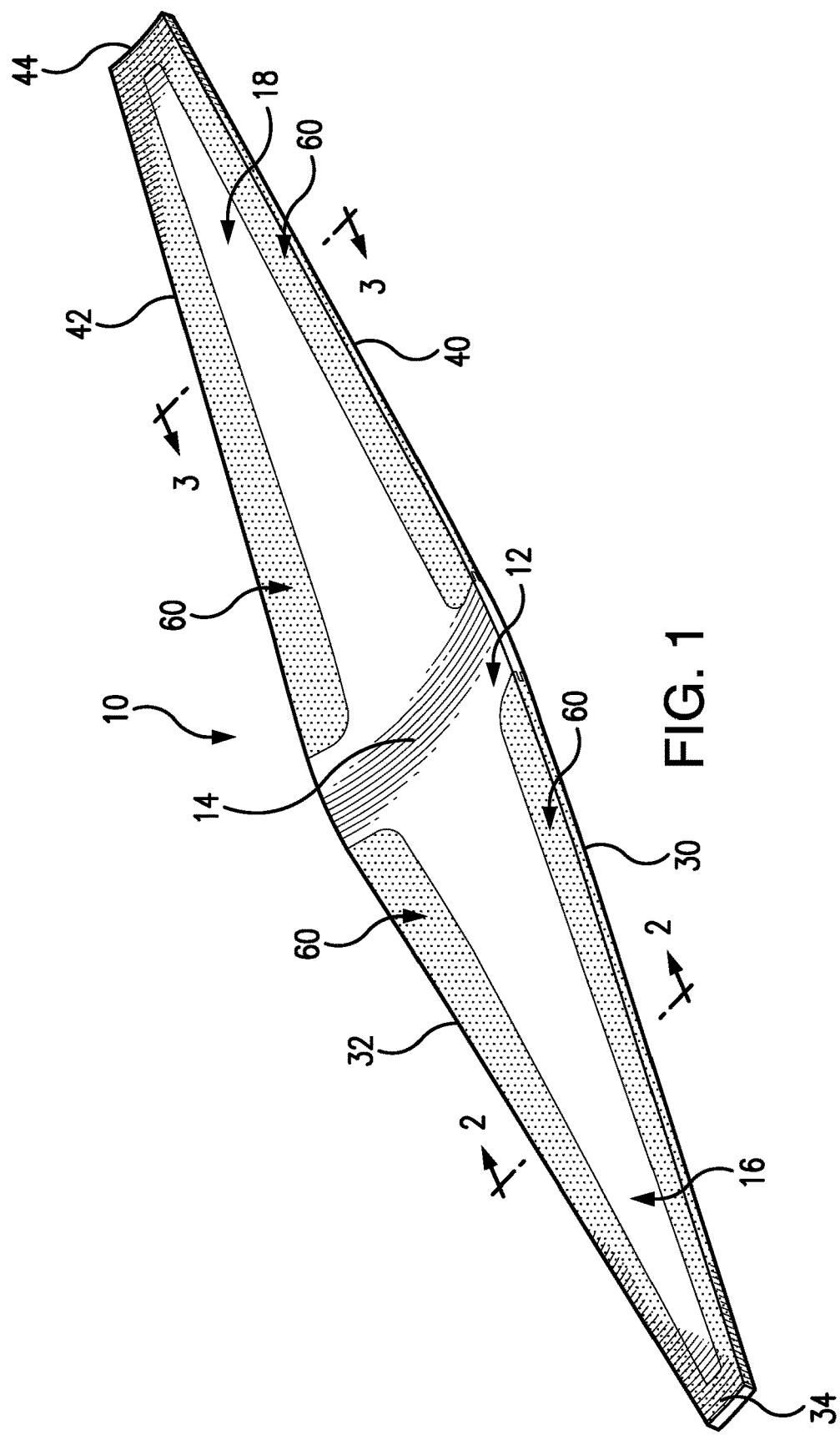

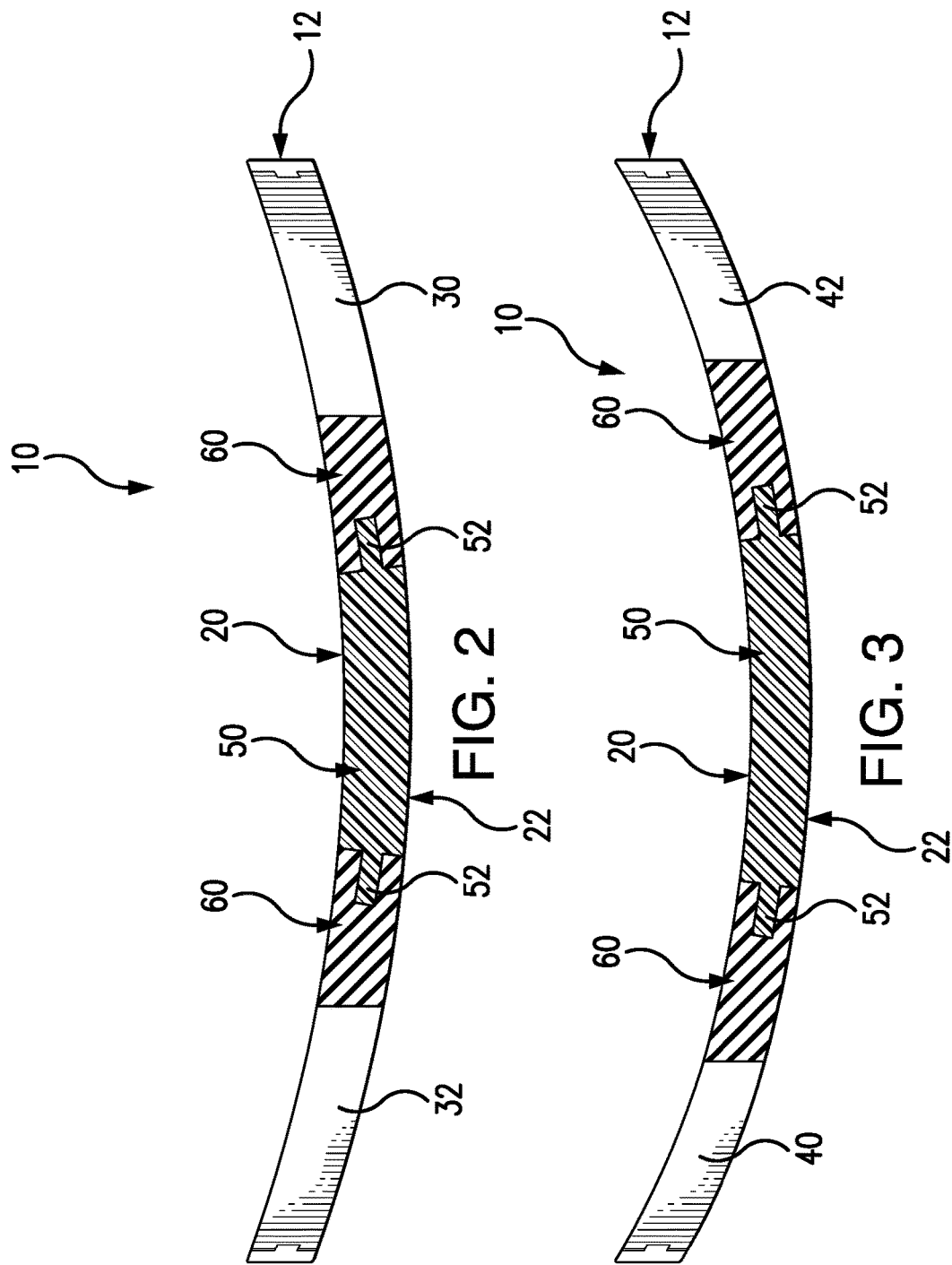

WINDOW TINTING TOOL

BACKGROUND OF THE INVENTION

Field of the Invention

The present invention relates to squeegee type tools, and more particularly, to a tool having a skeletal structure and flexible blade edges for applying window tint film to a curved window surface, and specifically to a rear window of an automobile.

Discussion of the Related Art

The process of applying window tint to a window typically requires spraying a soapy water solution onto the previously cleaned window surface and then placing the tint film on the soapy water surface of the window so that the tint film covers the entire window surface area. Thereafter, a squeegee or other tool is used to push the air bubbles and soapy water solution to the edges of the tint film in order to remove the air bubbles and excess solution from between the tint film and the glass, while also removing wrinkles and creases so that the tint film is pressed perfectly smooth against the window surface.

The application of window tint film to automobile windows is a little more challenging due to the varying degrees of curvature of automobile windows. The side windows of an automobile are typically curved to some degree, while the rear window of an automobile is usually curved from top to bottom as well as from side to side. Due to the varying shapes, curvatures and access to automobile window surfaces, a need has arisen for various tools to effectively apply window tint film to the different windows of an automobile. Applying window tint film to the inside surface of a rear window of an automobile (e.g., a passenger vehicle) can be particularly challenging and tedious, primarily due to the complex curvature of rear windows in many different automobile makes and models. In particular, it can be difficult to access the side and bottom edges, as well as the inside surface of a rear window when attempting to remove the air bubbles and excess solution, according to the process described above.

Accordingly, there remains a definite and urgent need for a tool that is specifically suited for use in the process of applying window tint film to the inside surface of rear windows of automobiles. More particularly, there is a definite need for an improved window tinting tool that is specifically structured and designed to permit access to the side and bottom edges, and inside surfaces of rear windows in automobiles, while conforming to the various compound curvatures of rear windows in various automobile makes and models.

OBJECTS AND ADVANTAGES OF THE INVENTION

Considering the forgoing, it is a primary object of the present invention to provide a tool for use in applying tint film to a curved window surface, and wherein the tool includes elongate flexible blade edges and a skeletal structure that is more rigid than the flexible blade edges for maintaining a desired curvature of the tool, while resisting against excessive flexing and bending.

It is a further object of the present invention to provide a tool for use in applying tint film to a curved window surface, and wherein the tool has varying degrees of curvature.

It is still a further object of the present invention to provide a tool for use in applying tint film to a curved window surface, and wherein the tool has a central portion and opposite first and second elongate wings extending outwardly from the central portion, and wherein each wing has a different degree of curvature measured between a forward edge and a rear edge.

It is still a further object of the present invention to provide a tool for use in applying tint film to a curved window surface, and wherein the tool is specifically designed for use when applying window tint film to the inside curved surface of a rear window of an automobile.

It is still a further object of the present invention to provide a window tinting tool for use when applying tint film to the inside curved surface of a rear window of an automobile, and wherein the tool is specifically designed to reach the bottom edge, upper and lower corners and side edges of the curved window surface in order to push air bubbles and solution out from between the window surface and the tint film, and to remove wrinkles and creases in the tint film so that the tint film is pressed perfectly smooth against the curved window surface.

These and other objects and advantages of the present invention are more readily apparent with reference to the following detailed description taken in conjunction with the accompanying drawings.

SUMMARY OF THE INVENTION

The present invention is directed to a tool for applying tint film to the rear window of an automobile. The tool has a unitary body with a concave top side and a convex bottom side, and the unitary body including a first elongate wing with front and rear edges extending to a first distal end, and an opposite second elongate wing with front and rear edges extending to a second distal end, and a central portion between the first and second elongate wings. The unitary body includes a skeletal frame member and flexible blades fitted to the skeletal frame member and extending about a periphery of the first and second elongate wings to define the front and rear edges and distal ends. The skeletal frame maintains desired curvature and prevents excessive flexing and bending of the elongate wings. The first and second wings have different degrees of curvature measured transversely between the respective front and rear edges and formed about a predetermined radius.

BRIEF DESCRIPTION OF THE DRAWINGS

For a fuller understanding of the nature of the present invention, reference should be made to the following detailed description taken in conjunction with the accompanying drawings in which:

FIG. 1 is a top perspective view of the window tinting tool of the present invention;

FIG. 2 is a cross-sectional view taken along the plane of the line indicated by the arrows 2-2 in FIG. 1;

FIG. 3 is a cross-sectional view taken along the plane of the line indicated by the arrows 3-3 in FIG. 1;

Like reference numerals refer to like parts throughout the several views of the drawings.

DETAILED DESCRIPTION OF THE PREFERRED EMBODIMENT

Figure 4:
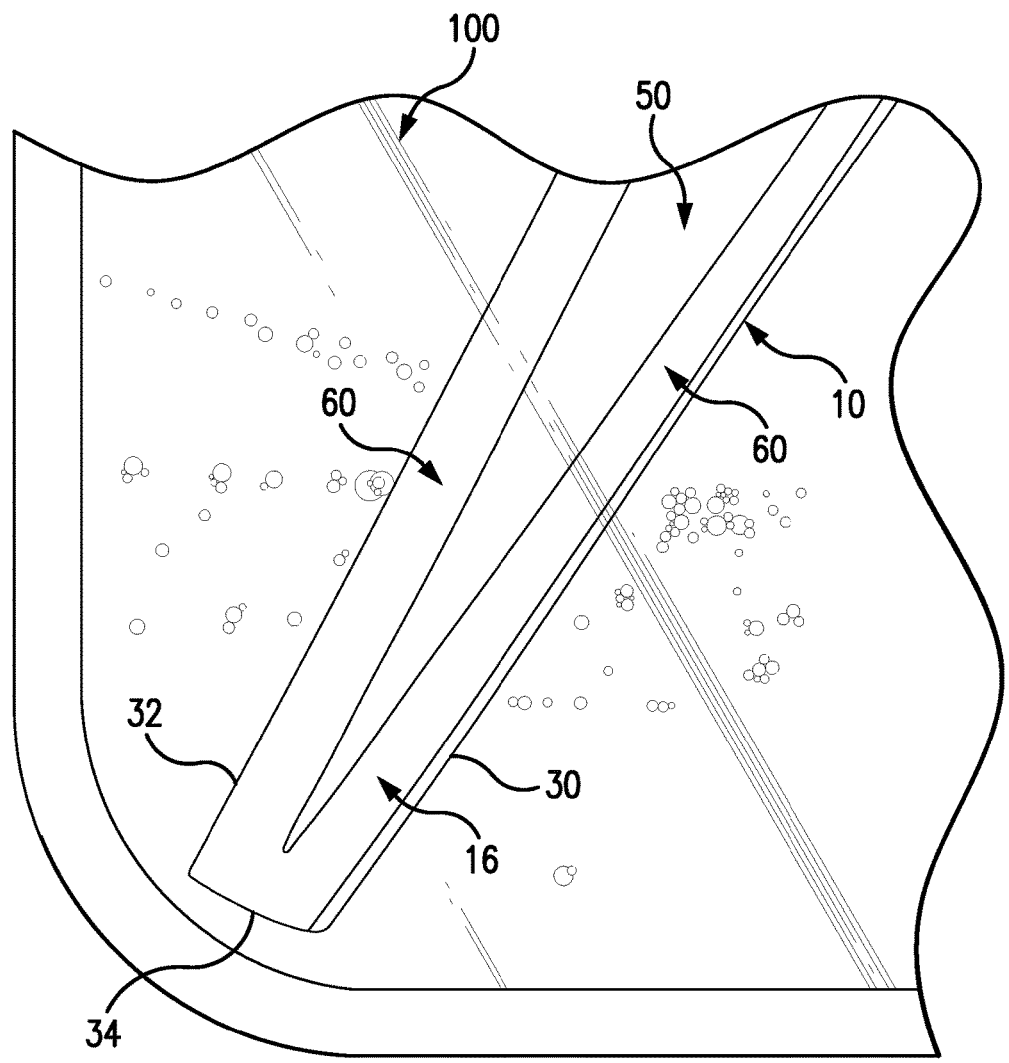
FIG. 4 is an isolated perspective view showing a wing of the tool being used to reach a bottom corner of an inside curved surface of a rear window of an automobile for removing air bubbles and solution between window tint film and the curved window surface.
Figure 5:
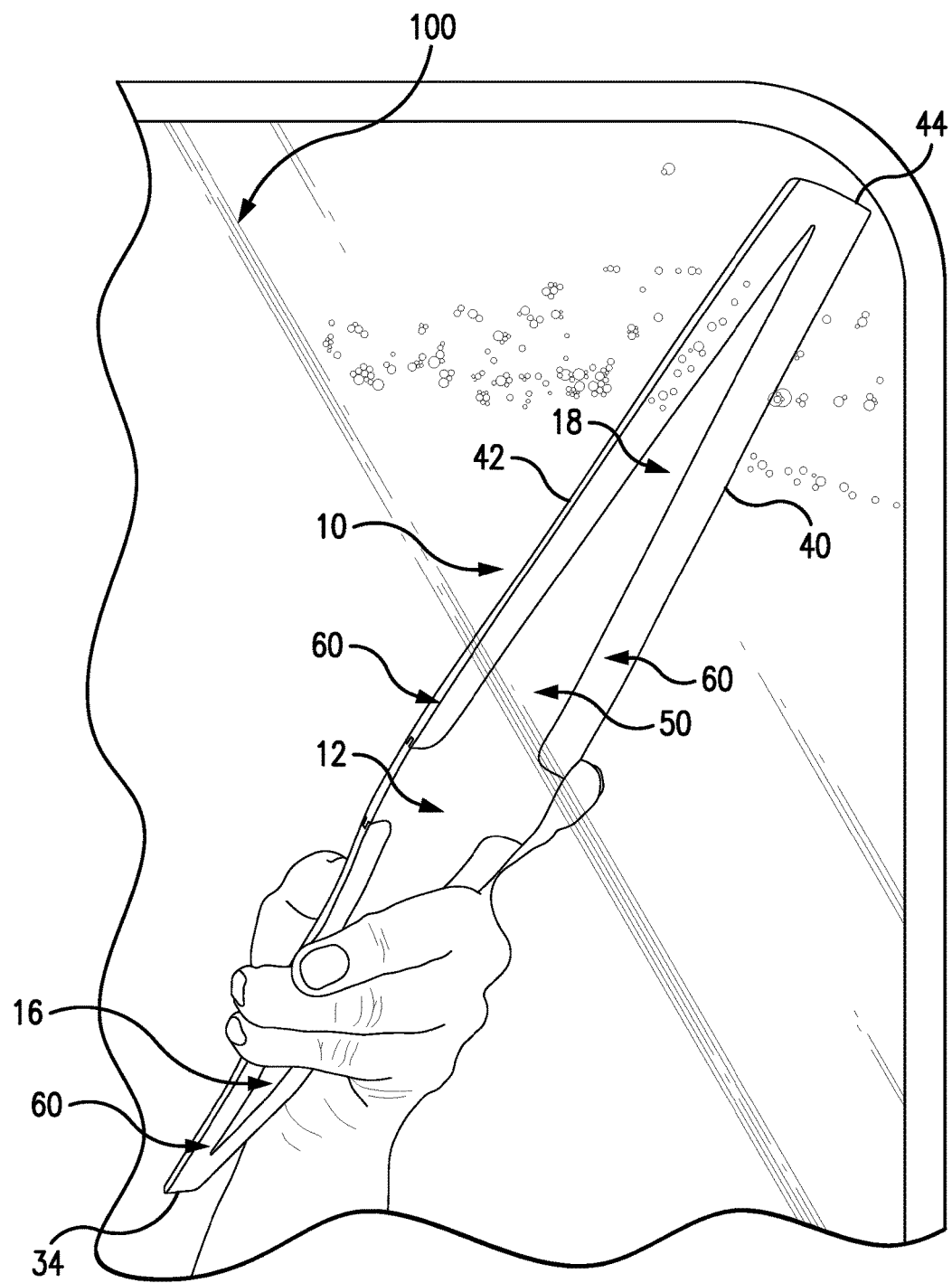
FIG. 5 is a perspective view showing a user grasping the tool of the present invention and reaching to a top corner of the inside of a curved rear window of an automobile for removing air bubbles and solution from between window tint film and the curved inside surface of the rear automobile window and removing wrinkles and creases near the top corner.

Referring to the several views of the drawings, the window tinting tool of the present invention is shown and is generally indicated as 10 throughout. The tool 10 includes a unitary body 12 having a central zone 14 and opposite elongate wings extending outwardly from the central zone 14, including a first elongate wing 16 and a second elongate wing 18. The main body further includes a concave top side 20 and a convex bottom side 22 (see FIGS. 2-3). The first elongate wing includes a front edge 30, a rear edge 32 and a distal end 34. The opposite second elongate wing includes a front edge 40, a rear edge 42 and a distal end 44.

The shape of the unitary body 12 is determined by a molded skeletal frame member 50 that is formed and configured to provide the concave top side 20 and convex bottom side 22. More particularly, the skeletal frame member 50 is formed to provide a first degree of curvature to the first elongate wing 16 measured between the front and rear edges 30 and 32, and a second degree of curvature to the second elongate wing measured between the front and rear edges 40 and 42. The degree of curvature is formed about a radius measured from a common central axis. In a preferred embodiment, the radius of the first elongate wing 16 is different than the radius of the second elongate wing 18 so that the degree of curvature of the first elongate wing 16 is different than the degree of curvature of the second elongate wing 18. With reference to FIGS. 2 and 3, it can be seen that the degree of curvature of the first elongate wing 16 has a larger radius, and thus less curvature than the second elongate wing 18 which has a smaller radius and a higher degree of curvature. Depending upon the curvature of the inside surface of the rear window of the automobile, to which tint film is being applied, it may be desirable to use either the first elongate wing 16 of the tool 10 or the second elongate wing 18 of the tool 10.

Each wing member further includes a flexible blade 60 that is attached to the skeletal frame member 50. The flexible blade 60 extends along the front and rear edges of each of the elongate wings and about the distal ends. Specifically, the flexible blade 60 fitted to the first elongate wing 16 defines the front edge 30, the distal end 34 and the rear edge 32 of the first elongate wing 16. Likewise, the flexible blade 60 fitted to the opposite second elongate wing 18 defines the front edge 40, the rear edge 42 and the distal end 44. The flexible blades on the first and second elongate wing members are specifically structured and disposed for engaging the tint film on the window surface whereupon application of pressure and movement of the blade 60 along the tint film causes air bubbles and solution to be pushed out towards edges of the tint film so that it can be removed from between the tint film and the surface of the window 100. As seen in FIGS. 2 and 3, the skeletal frame member 50 includes lips 52 that allow for attachment of the flexible blades 60 to the skeletal frame member 50. The lips may include apertures formed therethrough so that the flexible material of the blades 60 can pass through the apertures during the molding process, to more securely fix the flexible blades 60 to the skeletal frame member 50. The material of the flexible blades 60 is preferably a mix of a plastic and rubber composition mixed at a ratio to provide the desired degree of flexibility. The material of the skeletal frame member is preferably a plastic material that has greater rigidity than the flexible blades 60 in order to maintain the desired curvature of the tool and to discourage excessive flexing and bending of the elongate wings 16 and 18.

While the present invention has been shown and described in accordance with a preferred and practical embodiment thereof, it is recognized that departures from the instant disclosure are fully contemplated within the spirit and scope of the present invention which is not to be limited except as defined in the following claims.

What is claimed is:

1. A tool for applying tint film to an automobile window comprising:
   a unitary body including a concave top side, a convex bottom side, a first elongate wing having front and rear edges extending to a first distal end, an opposite second elongate wing having front and rear edges extending to a second distal end, and a central zone between the first and second elongate wings, the central zone having a front edge and a rear edge, and the unitary body having a maximum width at the central zone measured transversely between the front edge and the rear edge of the central zone at the center of the central zone, and the first elongate wing progressively decreasing in width from the central zone to the first distal end and the second elongate wing progressively decreasing in width from the central zone to the second distal end, wherein the width of the first and second elongate wings at any given location therealong is measured transversally between the respective front and rear edges, and the first elongate wing having a minimal width at the first distal end, and the second elongate wing having a minimal width at the second distal end;
   the unitary body includes a skeletal frame member formed and configured to provide a first degree of curvature measured between the front and rear edges of the first elongate wing and a second degree of curvature measured between the front and rear edges of the second elongate wing, and the first degree of curvature being different than the second degree of curvature;
   at least one flexible blade attached to the skeletal frame member and extending along the front and rear edges of the first and second elongate wings for engaging the tint film during use of the tool; and
   the skeletal frame member being less flexible than the at least one flexible blade and the skeletal frame member being structured and disposed for maintaining the first and second degrees of curvature.

2. The tool as recited in claim 1 wherein the at least one flexible blade extends continuously along the front edge, the distal end and the rear edge of each of the first and second elongate wings.

3. The tool as recited in claim 2 further comprising:
   a first one of the flexible blades extending from the central zone and along the front edge, the distal end and the rear edge of the first elongate wing; and
   a second one of the flexible blades extending from the central zone and along the front edge, the distal end and the rear edge of the second elongate wing.

4. The tool as recited in claim 1 wherein the at least one flexible blade is formed of a combined plastic and rubber composition.

5. The tool as recited in claim 1 wherein the skeletal frame member is formed of a plastic composition that is molded to include the concave top side, the convex bottom side and the first and second degrees of curvature.

6. The tool as recited in claim 1 wherein the first degree of curvature of the first elongate wing is formed about a first radius measured from a central longitudinal axis; and the second degree of curvature is formed about a second radius measured from the central longitudinal axis.

\* \* \* \* \*